(12) United States Patent
Chai

(10) Patent No.: US 9,116,377 B2
(45) Date of Patent: Aug. 25, 2015

(54) LIQUID CRYSTAL DISPLAY AND THE OUTER FRAME ASSEMBLY THEREOF

(71) Applicant: Shenzhen China Star Optoelectronics Technology Co., Ltd., Shenzhen, Guangdong (CN)

(72) Inventor: Li Chai, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 249 days.

(21) Appl. No.: 13/978,393

(22) PCT Filed: Jun. 26, 2013

(86) PCT No.: PCT/CN2013/078002
§ 371 (c)(1),
(2) Date: Jul. 4, 2013

(87) PCT Pub. No.: WO2014/205674
PCT Pub. Date: Dec. 31, 2014

(65) Prior Publication Data
US 2014/0375923 A1    Dec. 25, 2014

(30) Foreign Application Priority Data

Jun. 24, 2013  (CN) .......................... 2013 1 0253741

(51) Int. Cl.
*G02F 1/1333*    (2006.01)
(52) U.S. Cl.
CPC  *G02F 1/133308* (2013.01); *G02F 2001/13332* (2013.01); *G02F 2001/133314* (2013.01); *G02F 2001/133322* (2013.01); *G02F 2001/133325* (2013.01); *G02F 2201/465* (2013.01)

(58) Field of Classification Search
CPC ............ G02F 1/1333; G02F 1/133308; G02F 1/1335; G02F 2001/133322; G02F 1/133317; G02F 1/133328; G02F 1/133314; G06F 1/1601; G06F 1/1626; G06F 1/1637
USPC ....................................... 349/58; 361/679.21
See application file for complete search history.

(56) References Cited

U.S. PATENT DOCUMENTS 7,226,201 B1 *  6/2007  Li et al. ......................... 362/633
2010/0302717 A1 * 12/2010  Oh et al. ................... 361/679.01

* cited by examiner

*Primary Examiner* — Edward Glick
*Assistant Examiner* — William Peterson
(74) *Attorney, Agent, or Firm* — Andrew C. Cheng

(57) ABSTRACT

A liquid crystal display and an outer frame assembly are disclosed. The outer frame assembly includes a front frame and a back frame. The front frame includes a plurality of inserting portions having clasp portions. The back frame includes a first cover, a second cover and a looking plate between the first cover and the second cover. The first cover, the locking plate, and the second cover respectively includes a plurality of first through holes, a plurality of second through holes, and a plurality of locking recesses. The inserting portions are inserted into the first through holes, the second through holes and the locking recesses. The locking plate is pulled to engage with the clasp portions. The locking plate is positioned so as to fix the front frame and the back frame with respect to each other. The outer frame assembly of the liquid crystal display may be assembled and disassembled in an efficient way.

15 Claims, 4 Drawing Sheets

LIQUID CRYSTAL DISPLAY AND THE OUTER FRAME ASSEMBLY THEREOF

BACKGROUND OF THE INVENTION

1. Field of the Invention

The present disclosure relates to liquid crystal display technology, and more particularly to a liquid crystal display (LCD) and the outer frame assembly thereof.

2. Discussion of the Related Art

LCDs typically are characterized by attributes including thin, power-saving, and low radiation. These are reasons that the display devices adopting cold cathode fluorescent lamps (CCFL) or ionic liquid crystal technologies have been replaced.

LCDs include a liquid crystal display panel, a backlight module and an outer frame assembly having a front frame and a back frame. A peripheral edge of one of the front frame or the back frame includes a plurality of through holes, and the peripheral edge of the other one includes a plurality of screw holes. The liquid crystal display panel and the backlight module are stacked. Afterward, the through holes and the screw holes are aligned such that the screws may pass by the through holes and then engage with the screw holes. As such, the front frame and the back frame are fixed with respect to each other. The liquid crystal display panel and the backlight module are also fixed with respect to each other via the outer frame assembly.

However, not only a lot of screws are needed in the above assembling process, but also manpower and the assembling time are consumed.

SUMMARY

The object of the invention is to provide a liquid crystal display and the outer frame assembly thereof that can be assembled in an efficient way.

In one aspect, an outer frame assembly of a liquid crystal display (LCD) includes: a front frame comprising a first body and a plurality of inserting portions vertically extending from edges of the first body, and the inserting portion comprises a clasp portion; a back frame comprising a first cover, a second cover and a locking plate between the first cover and the second cover, the first cover and the second cover comprise positioning components for positioning the first cover and the second cover with respect to each other, the first cover, the locking plate, and the second cover respectively comprises a plurality of first through holes, a plurality of second through holes, and a plurality of locking recesses arranged corresponding to locations of the inserting portions; and wherein after the inserting portions are inserted into the first through holes, the second through holes and the locking recesses, the locking plate engages with the clasp portions to prevent the inserting portions from detaching from the back frame, and the locking plate is positioned with respect to the first cover or the second cover so as to fix the front frame and the back frame.

Wherein the clasp portion is a recess.

Wherein the shape of the clasp portion is rectangular, U-shaped, or semicircle.

Wherein the locking plate comprises a second body with the second through holes and a fixing portion extending from one end of the second body along the first direction (X), and after the inserting portions are inserted into the first through holes, the second through holes and the locking recesses, the locking plate clasps with the clasp portions after the fixing portion is pulled along the first direction (X).

Wherein the fixing portion is bent to be on an outer side of the second cover so as to be fixed on the second cover after the locking plate clasps with the clasp portion.

Wherein the fixing, portion comprises at least one through hole.

Wherein the second cover comprises guiding bars arranged along the first direction (X), and sliding slots are arranged on the corresponding locations of the locking plate, and the length of the sliding slots are larger than the length of the guiding bars such that the locking plate and the second cover are prevented from moving along a second direction (Y) when the locking plate moves with respect to the second cover along the first direction (X), and the second direction (Y) is vertical to the first direction (X).

Wherein the positioning components comprise a bulge and a positioning recess arranged respectively on the first cover and the second cover, and the bulge engages with the positioning recess to prevent the first cover and the second cover from moving with respect to each other in the first direction (X) and the second direction (Y).

In another aspect, a liquid crystal display (LCD) includes: a display panel and a backlight module; and an outer frame assembly comprises: a front frame comprising a first body and a plurality of inserting portions vertically extending from edges of the first body, and the inserting portion comprises a clasp portion; and a back frame comprising a first cover, a second cover and a locking plate between the first cover and the second cover, the first cover and the second cover comprise positioning components for positioning the first cover and the second cover with respect to each other, the first cover, the locking plate, and the second cover respectively comprises a plurality of first through holes, a plurality of second through holes, and a plurality of locking recesses arranged corresponding to locations of the inserting portions, the inserting portions are inserted into the first through holes, the second through holes and the locking recesses after the second cover, the locking plate, the first cover, the backlight module, the display panel, and the front frame are stacked in turn, the locking plate is pulled along a first direction so that the locking plate engages with the clasp portions to prevent the inserting portions from detaching from the back frame, and the locking plate is positioned on the back plate of the backlight module such that the display panel and the backlight module are positioned within the outer frame assembly.

Wherein the locking plate comprises a second body with the second through holes and a fixing portion extending from one end of the second body along the first direction (X), and after the inserting portions are inserted into the first through holes, the second through holes and the locking recesses, the locking plate clasps with the clasp portions after the fixing portion is pulled along the first direction (X).

Wherein the fixing portion is bent to be on an outer side of the second cover so as to be fixed on the back plate of the backlight module.

Wherein the clasp portion is a recess.

Wherein the shape of the clasp portion is rectangular, U-shaped, or semicircle.

Wherein the fixing portion comprises at least one through hole, the back plate comprises at least one screw hole corresponding to the through holes, and the screw passes by the through holes and engages with the screw hole.

Wherein the second cover comprises guiding bars arranged along the first direction (X), and sliding slots are arranged on the corresponding locations of the locking plate, and the length of the sliding slots are larger than the length of the guiding bars such that the locking plate and the second cover are prevented from moving along a second direction (Y)

when the locking plate moves with respect to the second cover along the first direction (X), and the second direction (Y) is vertical to the first direction (X).

DETAILED DESCRIPTION OF THE EMBODIMENTS

Embodiments of the invention will now be described more fully hereinafter with reference to the accompanying drawings, in which embodiments of the invention are shown.

Figure 1:
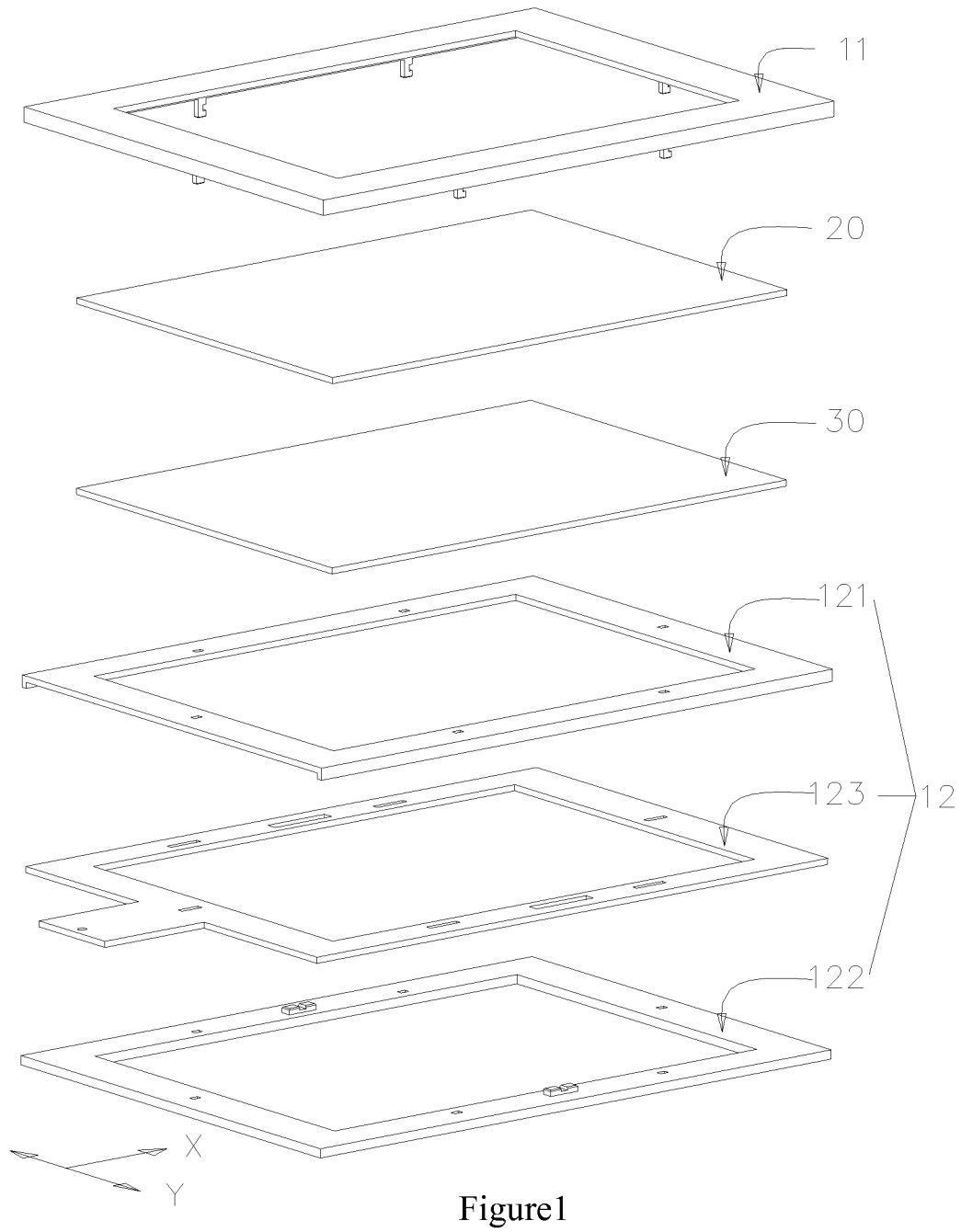
FIG. 1 is an exploded view of the LCD in accordance with one embodiment.
Figure 2:
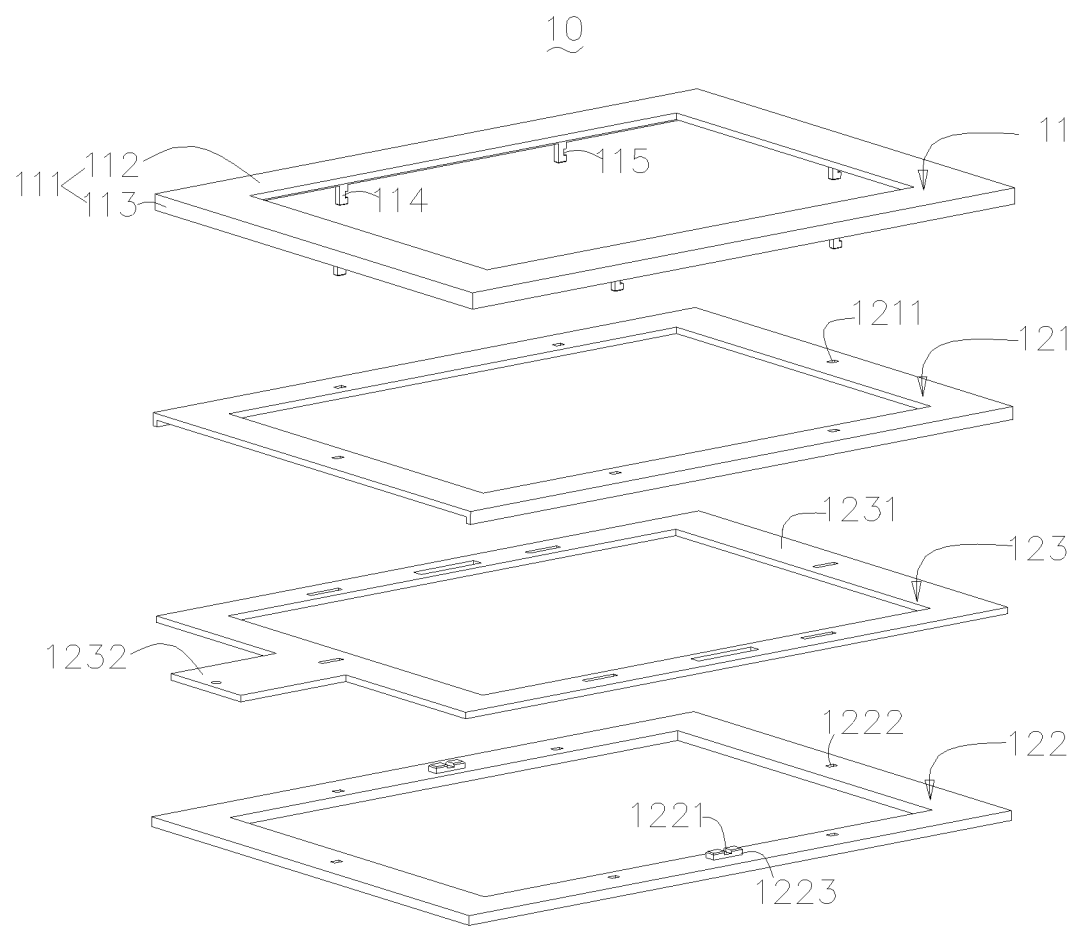
FIG. 2 is an exploded view of the outer frame assembly of the LCD of FIG. 1.
Figure 3:
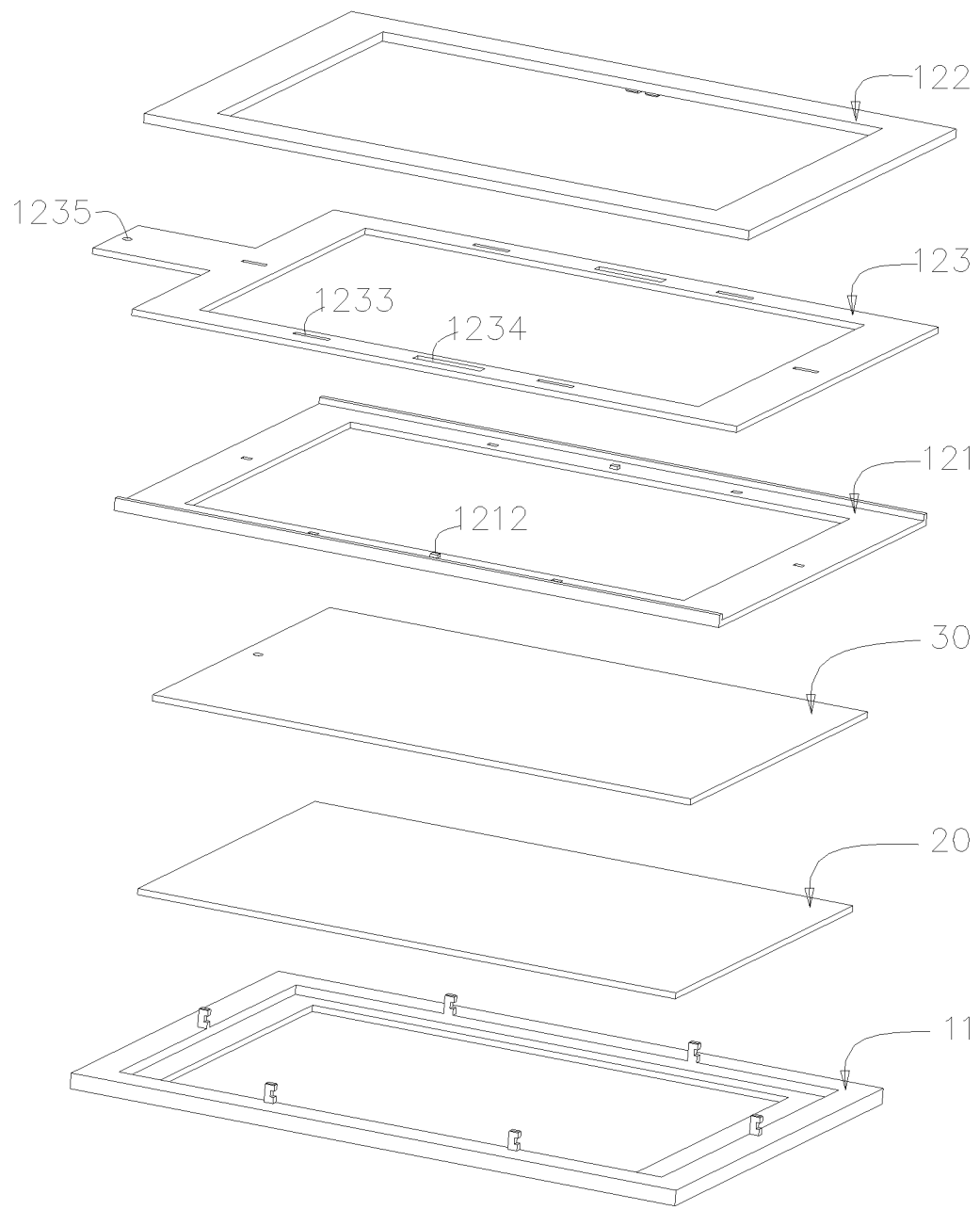
FIG. 3 is another exploded view of the LCD of FIG. 1 viewed from another angle.
Figure 4:
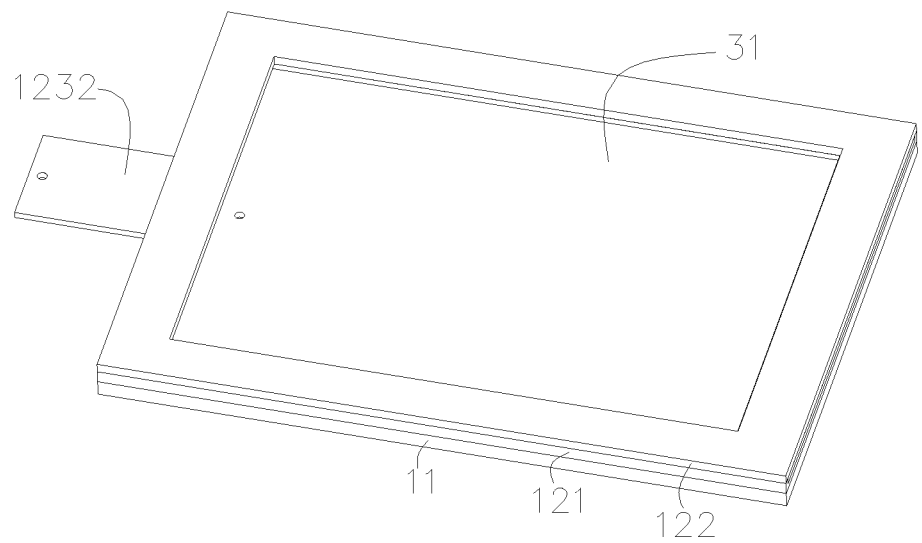
FIG. 4 is a schematic view showing the LCD of FIG. 1 before the locking plate is assembled with a first cover or a second cover.
Figure 5:
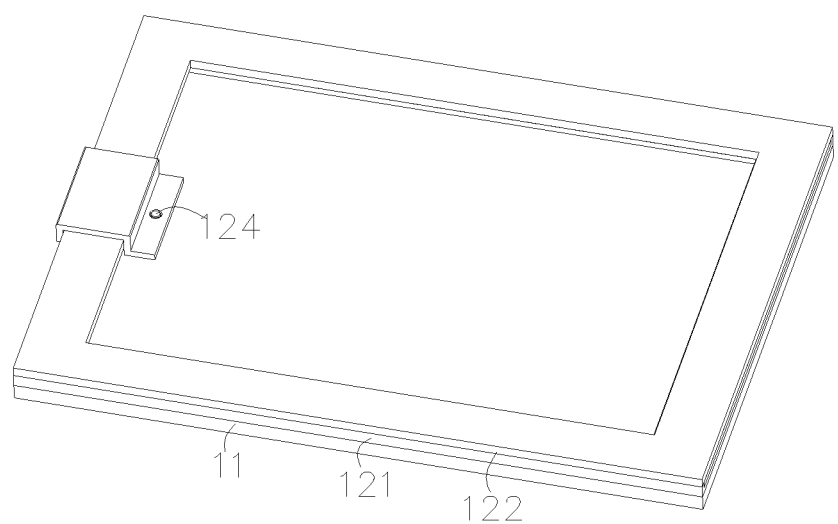
FIG. 5 is a schematic view showing the assembled LCD of FIG. 4

Referring to FIGS. 1 to 5, a LCD includes an outer frame assembly 10, a display panel 20 and a backlight module 30. The outer frame assembly 10 includes a front frame 11 and a back frame 12.

The front frame 11 includes a first body 111 and a plurality of inserting portions 114. The first body 111 includes a top surface 112 and a plurality of sidewalls 113 vertically extending from edges of the top surface 112. The sidewalls 113 are head-and-tail joined. The inserting portions 114 extend from a bottom of the sidewalls 113. Each of the inserting portions 114 includes a clasp portion 115. The clasp portion 115 may be a recess, and the shape of the recess may be rectangular, U-shaped, or semicircle.

In the embodiment, the top surface 112 of the first body 111 is rectangular-shaped. The first body 111 includes four sidewalls 113, and at least one inserting portion 114 is arranged on each of the sidewalls 113. In other embodiments, the number of the inserting portions 114 is not limited to the above disclosure. For example, the inserting portion 114 may be arranged only on a pair of sidewalls 113 or three of the sidewalls 113 for a small-dimension LCD.

The back frame 12 includes a first cover 121, a second cover 122 and a locking plate 123 therebetween. The shapes of the first cover 121 and the second cover 122 are substantially the same with that of the top surface of the front frame 11. The locking plate 123 includes a second body 1231 and a fixing portion 1232. The dimension of the second body 1231 is slightly smaller than that of the first cover 121 or second cover 122. The fixing portion 1232 extends from one end of the second body 1231. The fixing portion 1232 includes at least one through hole 1235. The fixing portion 1232 and the second body 1231 are arranged in the same plane. The extended direction of the fixing portion 1232 is hereinafter defined as a first direction (X).

The first cover 121, the locking plate 123, and the second cover 122 respectively includes a plurality of first through holes 1211, a plurality of second through holes 1233, and a plurality of locking recesses 1222 arranged corresponding to locations of the inserting portions 114. The first cover 121 and the second cover 122 include positioning components for positioning the first cover 121 and the second cover 122 with respect to each other. In the embodiment, the positioning components includes a bulge 1212 arranged on the first cover 121 and a positioning recess 1221 arranged on the second cover 122. In other embodiments, the bulge 1212 may be arranged on the second cover 122, and the positioning recess 1221 may be arranged on the first cover 121. The positioning recess 1221 engages with the bulge 1212 so as to prevent the first cover 121 and the second cover 122 from moving with respect to each other in the first direction (X), a second direction (Y) vertical to the first direction (X), and a third direction, which is the extended direction of the positioning recess 1221 and the bulge 1212. It is to be noted that the third direction is vertical to the first direction and the second direction.

After engaging the first cover 121 with the second cover 122 via the bulge 1212 and the positioning recess 1221, the locking plate 123 between the first cover 121 and the second cover 122 is capable of moving along the first direction (X). The dimension of the second body 1231 along the first direction (X) is smaller than that of the first cover 121 and the second cover 122.

In order to prevent, the locking plate 123 from moving along the second direction (Y), guiding bars 1223 are arranged one pair of edges of the second cover 122 parallel to the first direction (X). Sliding slots 1234 are arranged on the corresponding locations of the locking plate 123. The length of the sliding slots 1234 is larger than that of the guiding bars 1223. The second cover 122, the locking plate 123 and the first cover 121 are stacked in turn so as to align the locking recesses 1222 with the second through holes 1233 and the first through holes 1211. In this way, the guiding bars 1223 are located within the sliding slots 1234. There is a gap remaining in one end of the sliding slot 1234, which is farther from the fixing portion 1232. As such, the fixing portion 1232 may be pulled along the first direction (X) by users.

The display panel 20 and the backlight module 30 are received in a surrounding structure formed by the top surface 112 and the sidewalls 113 of the front frame 11. A back plate 31 of the backlight module 30 includes one or a plurality of screw holes (now shown) corresponding to the through holes 1235 on the fixing portion 1232.

The assembling process of the LCD will be described hereinafter. The second cover 122, the locking plate 123, the first cover 121, the backlight module 30, the display panel 20, and the front frame 11 are stacked in turn. The sliding slots 1234 of the locking plate 123 engage with the guiding bars 1223 of the second cover 122. The fixing portion 1232 is protrusive from the outer edge of the first cover 121 and the second cover 122. The bulge 1212 of the first cover 121 engages with the positioning recess 1221 of the second cover 122. The first through holes 1211, the second through holes 1233, and the locking recesses 1222 align with each other. The inserting portions 114 are inserted into the first through holes 1211, the second through holes 1233, and the locking recesses 1222. Afterward, the locking plate 123 is pulled along the first direction (X). The second through holes 1233 of the locking plate 123 move along the first direction (X) until engaging with the clasp portions 115 so as to prevent the inserting portions 114 from detaching from the back frame 12. Furthermore, the fixing portion 1232 is bent to be on an outer side of the second cover 122 until the through hole 1235 of the fixing portion 1232 aligns with the screw hole on the back plate 31. A screw 24 is then assembled with the through hole 1235 and the screw hole of the back plate 31 so as to fix the display panel 20 and the backlight module 30 with the outer frame assembly 10.

In other embodiments, the fixing portion 1232 may be fixed on the second cover 122 by using the screw, or the fixing portion 1232 may be fixed on the first cover 121 or the front frame 11 by the screw. In short, the locking plate 123 is assembled with the first cover 121 or the second cover 122 by fixing the fixing portion 1232 on one of the front frame 11, the first cover 121, the second cover 122, and the back plate 31. In this way, the front frame 11, the back frame 12, the display panel 20, and the backlight module 30 are assembled together.

In view of the above, the front frame 11 of the outer frame assembly 10 includes a plurality of inserting portions 114 having the clasp portions 115. The back frame 12 includes the first cover 121, the second cover 122, and the locking plate 123 therebetween. The first cover 121 and the second cover 122 are positioned with respect to each other. The first cover 121, the locking plate 123, and the second cover 122 respectively includes a plurality of first through holes 1211, a plurality of second through holes 1233, and a plurality of locking recesses 1222. The locations of the first through holes 1211, the second through holes 1233, and the locking recesses 1222 correspond to the locations of the inserting portions 114. The front frame 11 and the back frame 12 are stacked, and the inserting portions 114 are inserted into the first through holes 1211, the second through holes 1233, and the locking recesses 1222. At this moment, the locking plate 123 is pulled along the first direction (X) until the locking plate 123 clasps with the clasp portion 115 of the inserting portions 114. Afterward, the locking plate 123 is positioned with respect to the first cover 121 or the second cover 122 so as to fix the front frame 11 and the back frame 12. The assembling process is simple. In addition, the outer frame assembly 10 may be detached by pushing the locking plate 123 along the direction opposite to the first direction (X) after the locking plate 123 is disassembled from the first cover 121 or the second cover 122. In this way, the front frame 11 may be retrieved from the back frame 12. The assembling and the disassembling process of the outer frame assembly are simple and thus the manufacturing efficiency is enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An outer frame assembly of a liquid crystal display (LCD), comprising:
   a front frame comprising a first body and a plurality of inserting portions vertically extending from edges of the first body, and the inserting portion comprises a clasp portion;
   a back frame comprising a first cover, a second over and a locking plate between the first cover and the second cover, the first cover and the second cover comprise positioning components for positioning the first cover and the second cover with respect to each other, the first cover, the locking plate, and the second cover respectively comprises a plurality of first through holes, a plurality of second through holes, and a plurality of locking recesses arranged corresponding to locations of the inserting portions; and
   wherein after the inserting portions are inserted into the first through holes, the second through holes and the locking recesses, the locking plate engages with the clasp portions to prevent the inserting portions from detaching from the back frame, and the locking plate is positioned with respect to the first cover or the second cover so as to fix the front frame and the back frame.

2. The outer frame assembly as claimed in claim 1, wherein the clasp portion is a recess.

3. The outer frame assembly as claimed in claim 2, wherein the shape of the clasp portion is rectangular, U-shaped, or semicircle.

4. The outer frame assembly as claimed in claim 1, wherein the locking plate comprises a second body with the second through holes and a fixing portion extending from one end of the second body along the first direction (X), and after the inserting portions are inserted into the first through holes, the second through holes and the locking recesses, the locking plate clasps with the clasp portions after the fixing portion is pulled along the first direction (X).

5. The outer frame assembly as claimed in 3, wherein the fixing portion is bent to be on an outer side of the second cover so as to be fixed on the second cover after the locking plate clasps with the clasp portion.

6. The outer frame assembly as claimed in claim 5, wherein the fixing portion comprises at least one through hole.

7. The outer frame assembly as claimed in claim 1, wherein the second cover comprises guiding bars arranged along the first direction (X), and sliding slots are arranged on the corresponding locations of the locking plate, and the length of the sliding slots are larger than the length of the guiding bars such that the locking plate and the second cover are prevented from moving along a second direction (Y) when the locking plate moves with respect to the second cover along the first direction (X), and the second direction (Y) is vertical to the first direction (X).

8. The outer frame assembly as claimed in claim 1, wherein the positioning components comprise a bulge and a positioning recess arranged respectively on the first cover and the second cover, and the bulge engages with the positioning recess to prevent the first cover and the second cover from moving with respect to each other in the first direction (X) and the second direction (Y).

9. A liquid crystal display (LCD), comprising:
   a display panel and a backlight module; and
   an outer frame assembly comprises:
   a front frame comprising a first body and a plurality of inserting portions vertically extending from edges of the first body, and the inserting, portion comprises a clasp portion; and
   a back frame comprising a first cover, a second cover and a locking plate between the first cover and the second cover, the first cover and the second cover comprise positioning components for positioning the first cover and the second cover with respect to each other, the first cover, the locking plate, and the second cover respectively comprises a plurality of first through holes, a plurality of second through holes, and a plurality of locking recesses arranged corresponding to locations of the inserting portions, the inserting portions are inserted into the first through holes, the second through holes and the locking recesses after the second cover, the locking plate, the first cover, the backlight module, the display panel, and the front frame are stacked in turn, the locking plate is pulled along a first direction (X) so that the locking plate engages with the clasp portions to prevent the inserting portions from detaching from the back frame, and the locking plate is positioned on the back plate of the backlight module such that the display panel and the backlight module are positioned within the outer frame assembly.

10. The liquid crystal display as claimed in claim 9, wherein the locking plate comprises a second body with the second through holes and a fixing portion extending from one end of the second body along the first direction (X), and after the inserting portions are inserted into the first through holes, the second through holes and the locking recesses, the locking plate clasps with the clasp portions after the fixing portion is pulled along the first direction (X).

11. The liquid crystal display as claimed in claim 10, wherein the fixing portion is bent to be on an outer side of the second cover so as to be fixed on the back plate of the backlight module.

12. The liquid crystal display as claimed in claim 9, wherein the clasp portion is a recess.

13. The liquid crystal display as claimed in claim 12, wherein the shape of the clasp portion is rectangular, U-shaped, or semicircle.

14. The liquid crystal display as claimed in claim 9, wherein the fixing portion comprises at least one through hole, the back plate comprises at least one screw hole corresponding to the through holes, and a screw passes by the through holes and engages with the screw hole.

15. The liquid crystal display as claimed in claim 9, wherein the second cover comprises guiding bars arranged along the first direction (X), and sliding slots are arranged on the corresponding locations of the locking plate, and the length of the sliding slots are larger than the length of the guiding bars such that the locking plate and the second cover are prevented from moving along a second direction (Y) when the locking plate moves with respect to the second cover along the first direction (X), and the second direction (Y) is vertical to the first direction (X).

* * * * *